US012212124B2

(12) United States Patent
Javora et al.

(10) Patent No.: US 12,212,124 B2
(45) Date of Patent: Jan. 28, 2025

(54) MEDIUM VOLTAGE SWITCHGEAR OR CONTROL GEAR

(71) Applicant: ABB Schweiz AG, Baden (CH)

(72) Inventors: Radek Javora, Hrusovany u Brna (CZ); Tomas Kozel, Brno (CZ); Josef Cernohous, Jamne nad Orlici (CZ); Michal Skuci, Brno (CZ)

(73) Assignee: ABB Schweiz AG, Baden (CH)

( * ) Notice: Subject to any disclaimer, the term of this patent is extended or adjusted under 35 U.S.C. 154(b) by 183 days.

(21) Appl. No.: 17/965,229

(22) Filed: Oct. 13, 2022

(65) Prior Publication Data

US 2023/0029540 A1 Feb. 2, 2023

Related U.S. Application Data

(63) Continuation of application No. PCT/EP2021/057896, filed on Mar. 26, 2021.

(30) Foreign Application Priority Data

Apr. 14, 2020 (EP) .................................... 20169293

(51) Int. Cl.
*H02B 1/30* (2006.01)
*H02B 1/21* (2006.01)
(Continued)

(52) U.S. Cl.
CPC ............... *H02B 11/00* (2013.01); *H02B 1/21* (2013.01); *H02B 1/305* (2013.01); *H02B 13/0358* (2013.01); *H02B 13/02* (2013.01)

(58) Field of Classification Search
CPC .................. H02B 13/005; H02B 13/02; H02B 13/035–0358; H02B 1/305
See application file for complete search history.

(56) References Cited

U.S. PATENT DOCUMENTS 10,158,214 B1 * 12/2018 Yanniello ................. H02B 1/22
10,164,412 B1 * 12/2018 Yanniello ........... H02B 13/0352
(Continued)

FOREIGN PATENT DOCUMENTS

EP    1983625 A1    10/2008
EP    3267539 A1    1/2018
(Continued)

OTHER PUBLICATIONS

European Patent Office, Extended European Search Report in European Patent Application No. 20169293.6, 13 pp. (Aug. 27, 2020).

(Continued)

*Primary Examiner* — Robert J Hoffberg
(74) *Attorney, Agent, or Firm* — Leydig, Voit & Mayer, Ltd.

(57) ABSTRACT

A medium voltage switchgear or control gear includes at least one first compartment; a cable compartment; a plurality of main components; and a plurality of auxiliary components. The plurality of main components is housed in at least one part of the at least one first compartment. The plurality of auxiliary components is housed in the cable compartment. The second connector is configured to connect to the first connector to connect a cable in the cable compartment to a component of the plurality of main components. The cable compartment is configured to be disconnected from the at least one first compartment and wherein the cable compartment is configured to be spatially separated from the at least one first compartment.

11 Claims, 5 Drawing Sheets

(51) Int. Cl.
*H02B 11/00* (2006.01)
*H02B 13/035* (2006.01)
*H02B 13/02* (2006.01)

(56) References Cited

U.S. PATENT DOCUMENTS

| | | | |
|---|---|---|---|
| 10,923,888 B2* | 2/2021 | Benson | H02B 1/20 |
| 11,108,215 B2* | 8/2021 | Culhane | H02B 13/0358 |
| 11,682,885 B2* | 6/2023 | Kozel | H02B 1/26 |
| | | | 361/605 |

FOREIGN PATENT DOCUMENTS

| | | |
|---|---|---|
| EP | 3671986 A1 | 6/2020 |
| RU | 2496199 C2 | 10/2013 |
| WO | WO 2019/149451 A1 | 8/2019 |

OTHER PUBLICATIONS

European Patent Office, International Search Report in International Patent Application No. PCT/EP2021/057896, 4 pp. (Jun. 18, 2021).
European Patent Office, Written Opinion in International Patent Application No. PCT/EP2021/057896, 10 pp. (Jun. 18, 2021).

* cited by examiner

MEDIUM VOLTAGE SWITCHGEAR OR CONTROL GEAR

CROSS-REFERENCE TO RELATED APPLICATIONS

This patent application claims priority to International Patent Application No. PCT/EP2021/057896, filed on Mar. 26, 2021, which claims priority to European Patent Application No. 20169293.6, filed on Apr. 14, 2020, each of which is incorporated herein in its entirety by reference.

FIELD OF THE DISCLOSURE

The present invention relates a medium voltage switchgear or control gear.

BACKGROUND OF THE INVENTION

The installation of medium-voltage switchgear (also called panel or control gear) on a substation construction site is a complex and time-consuming task, with a major task relating to the installation of power cables into each panel. Such medium-voltage power cables are quite stiff and not so easy to bend and thus the pulling, bending, termination and connection to the medium voltage panel in a given limited space of such a panel is difficult and time consuming.

FIG. 1 shows an example of a typical present day medium voltage panel structure. The switchgear (also referred to as a panel) is segregated into several compartments and cables are connected at the bottom of switchgear. The switchgear has a circuit breaker compartment 1, a busbar compartment 2, a cable compartment 3, and low-voltage compartment 4. During installation of this type of switchgear on a substation construction site, first the switchgear is placed in a final position and then the cable installation starts. It is not possible to do it the other way round, as cables could be damaged, might not fit with the required length and/or the switchgear would need a complex lifting mechanism. As the space within cable compartment is very limited it is a cumbersome task to pull, terminate and connect the medium-voltage cables to the switchgear terminals, therefore this assembly needs skilled workers and consumes time. Alternative switchgear arrangement have reduced or smaller widths of the switchgear and cable connections are located in vertical arrangements. This further exacerbates cable installation, because the narrower switchgear width makes cable installation more complex and difficult due to the confined space.

BRIEF SUMMARY OF THE INVENTION

The present disclosure describes systems and methods that provide an improved technique to connect medium voltage cables to a medium voltage switchgear.

In a first aspect, there is provided a medium voltage switchgear or control gear, comprising:
  at least one first compartment;
  a cable compartment;
  a plurality of main switchgear or control gear components; and
  a plurality of auxiliary switchgear or control gear components.

The plurality of main switchgear or control gear components comprises a main busbar system, and/or a circuit breaker or disconnector, and a first connector. The plurality of main switchgear or control gear components are configured to be housed in at least one part of the at least one first compartment. The plurality of auxiliary switchgear or control gear components comprises a medium voltage cable, and a second connector. The plurality of auxiliary switchgear or control gear components are configured to be housed in the cable compartment. The second connector is configured to connect to the first connector to connect the medium voltage cable in the cable compartment to a component of the plurality of main switchgear or control gear components. The cable compartment is configured to be disconnected from the at least one first compartment and the cable compartment is configured to be spatially separated or spatially separable from the at least one first compartment. The disconnection of the cable compartment from the at least one first compartment comprises a disconnection of the first connector from the second connector.

BRIEF DESCRIPTION OF THE SEVERAL VIEWS OF THE DRAWING(S)

Figure 3A:
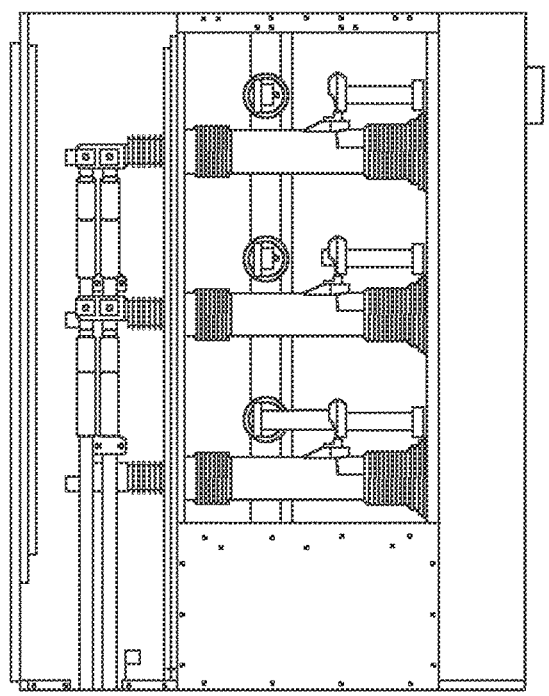
Figures 3B, 3C:
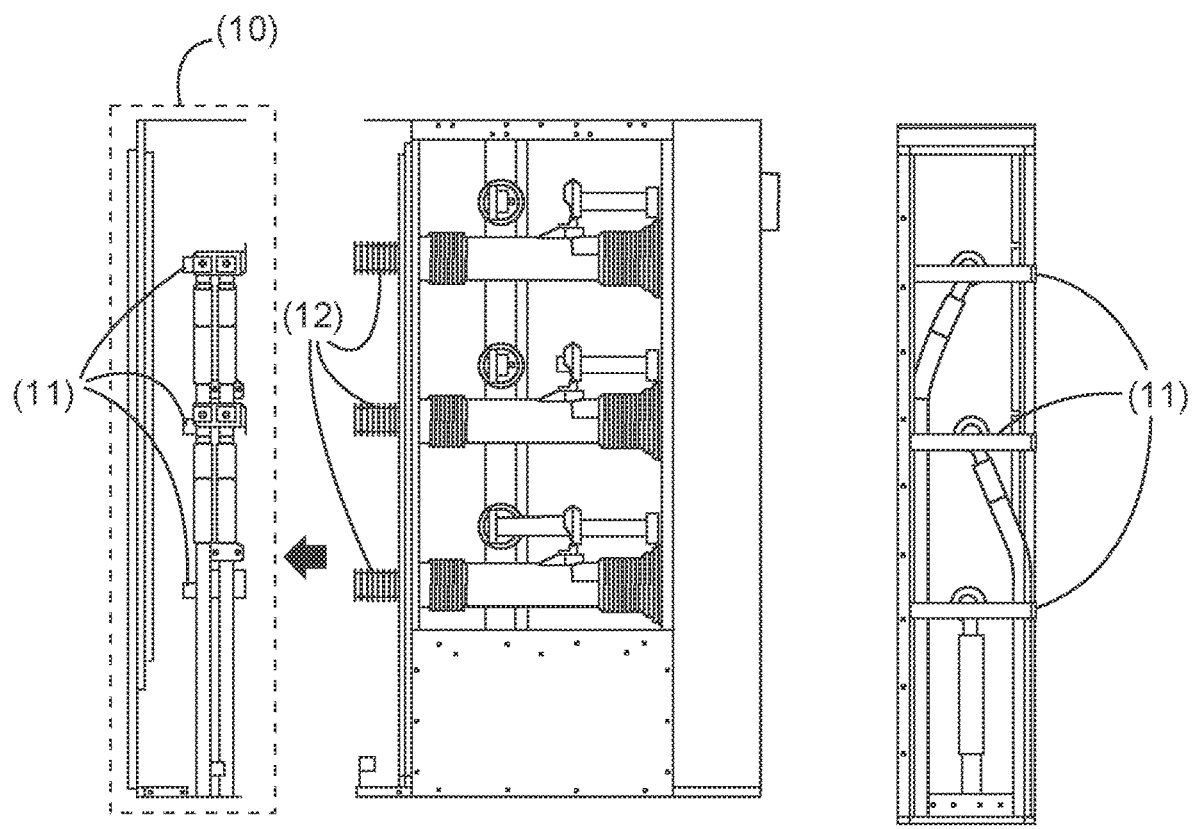

FIGS. 3a, 3b, and 3c are partial outline views from different perspectives of an exemplary switchgear where the cable compartment can be separated from the other parts of the switchgear in accordance with the disclosure.

Figures 4A, 4B:
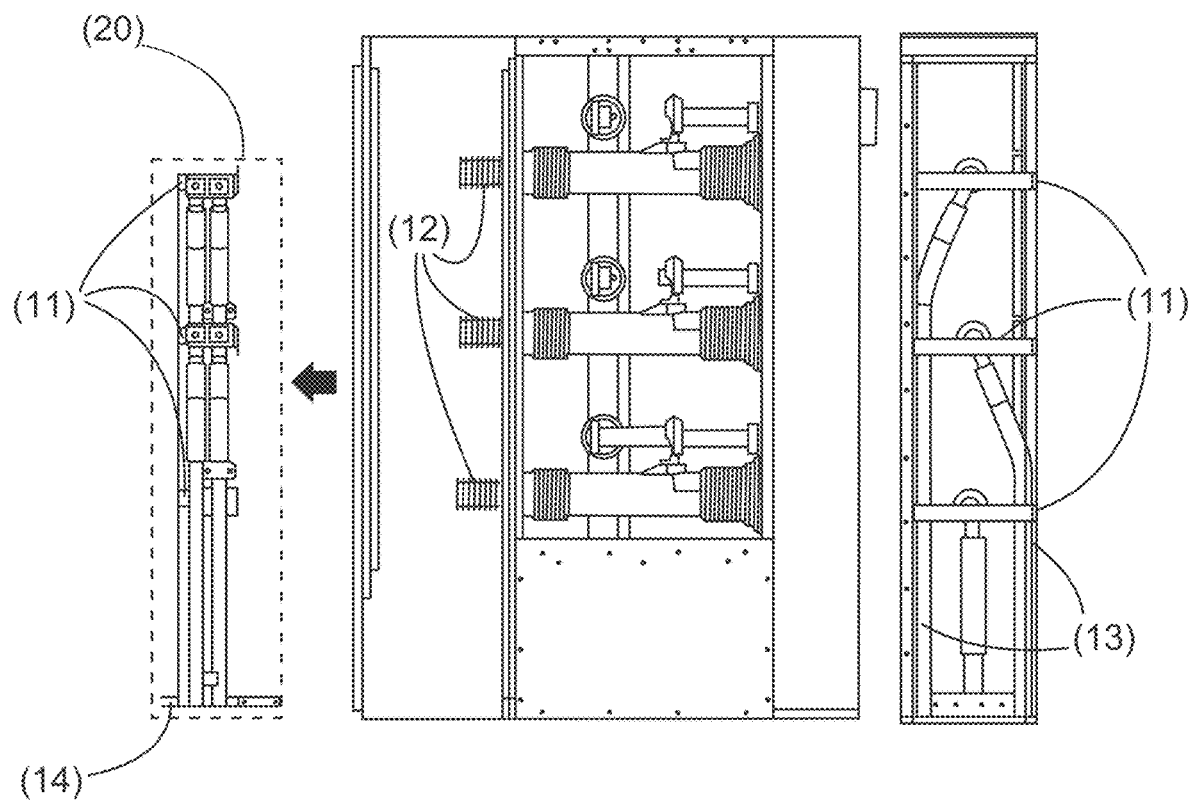

FIGS. 4a and 4b are outline views from different perspectives of an exemplary switchgear where the cable compartment can be separated from the other parts of the switchgear, in accordance with the disclosure.

Figure 5:
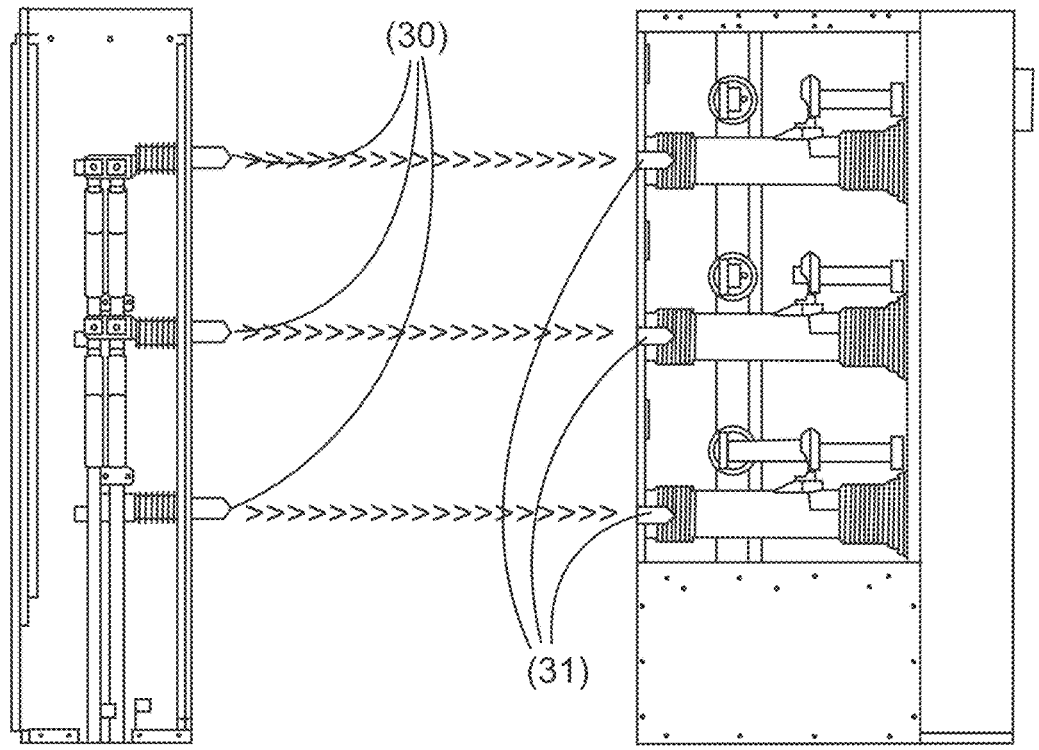

FIG. 5 a partially disassembled outline view of an exemplary connector arrangement for a switchgear where the cable compartment can be separated from the other parts of the switchgear in accordance with the disclosure.

DETAILED DESCRIPTION OF THE INVENTION

FIGS. 2a-5 relate to new designs of medium voltage switchgear or control gear.

According to an example, a medium voltage switchgear or control gear comprises at least one first compartment 1, 2, 4, a cable compartment 3, 10, 20, a plurality of main switchgear or control gear components, and a plurality of auxiliary switchgear or control gear components. The plurality of main switchgear or control gear components comprises a main busbar system, and/or a circuit breaker or disconnector, and a first connector 31. The plurality of main switchgear or control gear components are configured to be housed in at least one part of the at least one first compartment. The plurality of auxiliary switchgear or control gear components comprises a medium voltage cable, and a second connector 30. The plurality of auxiliary switchgear or control gear components are configured to be housed in the cable compartment. The second connector is configured to connect to the first connector to connect the medium voltage cable in the cable compartment to a component 12 of the plurality of main switchgear or control gear components. The cable compartment is configured to be disconnected from the at least one first compartment and the cable compartment is configured to be spatially separated from the at least one first compartment. The disconnection of the cable compartment from the at least one first compartment comprises a disconnection of the first connector from the second connector.

According to an example, when the cable compartment is connected to the at least one first compartment, the medium voltage switchgear or control gear is configured to provide an arc proof outer surface.

According to an example, when the cable compartment is disconnected from the at least one first compartment and spatially separated from the at least one first compartment, the cable compartment is configured to enable maintenance access from at least one side.

Thus, if the cable compartment is disconnected from the rest of switchgear, it will become accessible from that side. However, the cable compartment can have a removable rear wall, or side wall, as well and in this situation the cable compartment can be accessed from two sides.

In an example, when the cable compartment is disconnected from the at least one first compartment and spatially separated from the at least one first compartment, the cable compartment is configured to enable human maintenance/installation access from at least one side.

In an example, when the cable compartment is disconnected from the at least one first compartment and spatially separated from the at least one first compartment, the cable compartment is configured to enable robotic maintenance/installation access from at least one side.

According to an example, the plurality of auxiliary switchgear or control gear components comprises a cable connection bar that connects to the second connector at a first end and connects to the medium voltage cable at a second end. A holder 11 is configured to hold the cable connection bar in a connection position. Thus, the cable connection bar is configured to be held in a connection position by the holder 11.

According to an example, the holder is configured to be removed from the cable compartment.

According to an example, when the cable compartment is disconnected from the at least one first compartment and spatially separated from the at least one first compartment the holder 11 is configured to hold the cable connection bar in a connection position. Thus the cable connection bar is configured to be held in a connection position by the holder 11.

The holder 11, as shown in FIGS. 3a, 3b, 3c, 4a, 4b, and 4c, is in an example removed when the cable compartment is connected to the rest of the switchgear.

According to an example, the holder is compatible with medium voltage operation within a medium voltage switchgear or control gear.

According to an example, a supporting template 13 within the cable compartment is configured to fix the holder 11 at a defined position.

According to an example, the template 13 as well as holder 11 is configured to be removed from the cable compartment.

According to an example, the template is compatible with medium voltage operation within a medium voltage switchgear or control gear.

According to an example, the first connector 31 is directly connected to the component 12 of the plurality of main switchgear or control gear components.

According to an example, the at least one first compartment comprises a plurality of compartments 1, 2, 4.

In an example, the plurality of compartments comprises a circuit breaker compartment 1, a busbar compartment 2, and a low voltage compartment 4.

According to an example, the first connector 31 comprises a threaded hole within component 12 and the second connector 30 comprises a screw.

According to an example, the first connector 31 comprises a screw within component 12 and the second connector 30 comprises a threaded hole.

FIGS. 2a-5 also relate to a medium voltage switchgear or control gear comprising at least one first compartment 1, 2, 4, a cable compartment 3, 10, 20, a plurality of main switchgear or control gear components, and a plurality of auxiliary switchgear or control gear components. The plurality of main switchgear or control gear components comprises a main busbar system, a circuit breaker. The plurality of main switchgear or control gear components are configured to be housed in at least one part of the at least one first compartment. The plurality of auxiliary switchgear or control gear components comprises a medium voltage cable. The plurality of auxiliary switchgear or control gear components are configured to be housed in the cable compartment. The cable compartment comprises a first part and a second part 10, 20. A part 12 e and a first connector 31 are configured to be housed in the first part of the cable compartment. A second part 10, 20 and a second connector 30 are configured to be housed in the second part of the cable compartment. The second connector is configured to connect to the first connector to connect the medium voltage cable to a component 12 of the plurality of main switchgear or control gear components. The second part of the cable compartment is configured to be disconnected from the first part of the cable compartment and spatially separated from the first part of the cable compartment and spatially separated from the at least one first compartment. The disconnection of the second part cable compartment from the first part of the cable compartment comprises a disconnection of the first connector from the second connector.

In an example, the first part of the cable compartment is fixedly attached or connected to the at least one first compartment.

In an example, when the second part of the cable compartment is connected to the first part of the cable compartment, the medium voltage switchgear or control gear is configured to provide an arc proof outer surface.

In an example, when the second part of the cable compartment is disconnected from the first part of the cable compartment and spatially separated from the first part of the cable compartment and spatially separated from the at least one first compartment, the second part of the cable compartment is configured to enable maintenance access from at least one side.

In an example, when the second part of the cable compartment is disconnected from the first part of the cable compartment and spatially separated from the first part of the cable compartment and spatially separated from the at least one first compartment, the second part of the cable compartment is configured to enable human maintenance access from at least one side.

In an example, when the second part of the cable compartment is disconnected from the first part of the cable compartment and spatially separated from the first part of the cable compartment and spatially separated from the at least one first compartment, the second part of the cable compartment is configured to enable robotic maintenance access from at least one side.

In an example, the plurality of auxiliary switchgear or control gear components comprises a cable connection bar in the second part of the cable compartment that connects to the second connector at a first end and connects to the second part of the medium voltage cable at a second end. A holder 11 is configured to hold the cable connection bar in a place representing connection position. Thus the cable connection bar is configured to be held in a place representing connection position by a holder 11.

In an example, the holder is configured to be removed from the second part of the cable compartment.

In an example, when the second part of the cable compartment is disconnected from the first part of the cable compartment and spatially separated from the first part of the cable compartment and the at least one first compartment, the holder 11 is configured to hold the cable connection bar in a connection position. Thus the cable connection bar is configured to be held in a connection position by the holder 11.

In an example in a connected position, the cable is fixed a component 12 of the plurality of main switchgear or control gear components.

In an example, the holder is compatible with medium voltage operation within a medium voltage switchgear or control gear.

In an example, a supporting template 13 within the second part of the cable compartment is configured to fix the holder 11 at a defined position.

In an example, the template can be also configured to be removed from the second part of the cable compartment.

In an example, the template is compatible with medium voltage operation within a medium voltage switchgear or control gear.

In an example, the at least one first compartment comprises a plurality of compartments 1, 2, 4.

In an example, the plurality of compartments comprises a circuit breaker compartment 1, a busbar compartment 2, and a low voltage compartment 4.

In an example, the first connector 31 comprises a threaded hole within component 12 and the second connector 30 comprises a screw.

In an example, the first connector 31 comprises a screw within component 12 and the second connector 30 comprises a threaded hole.

The new designs of medium voltage switchgear or control gear are further described in specific detail, where reference is again made to FIGS. 2a-5.

As discussed above a new design of medium-voltage switchgear enables separation of at least one part of cable compartment used for connection of medium-voltage cables to medium-voltage switchgear.

Figure 1:
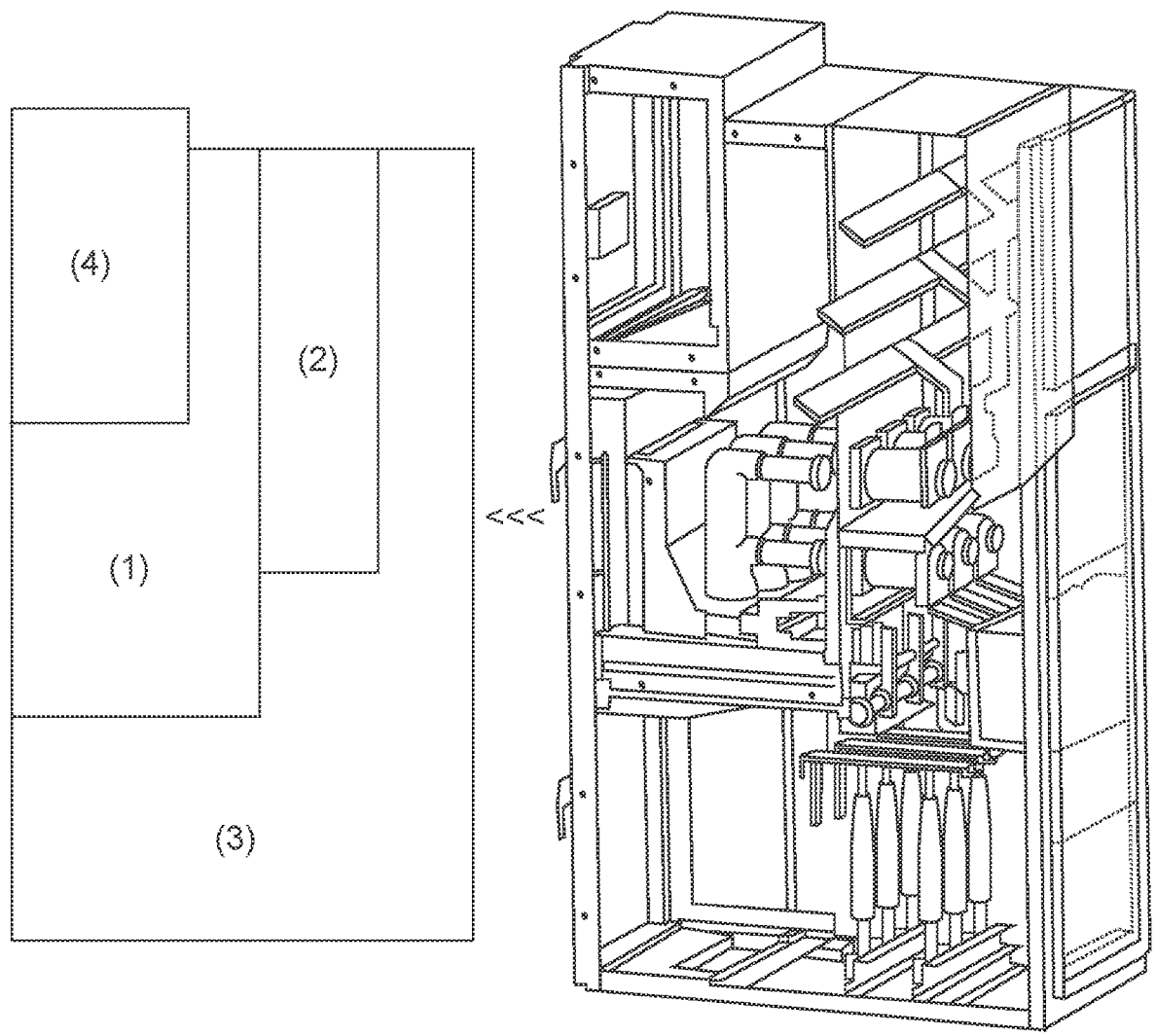
FIG. 1 shows a schematic illustration of a typical medium voltage switchgear in accordance with the prior art.
Figure 2A:
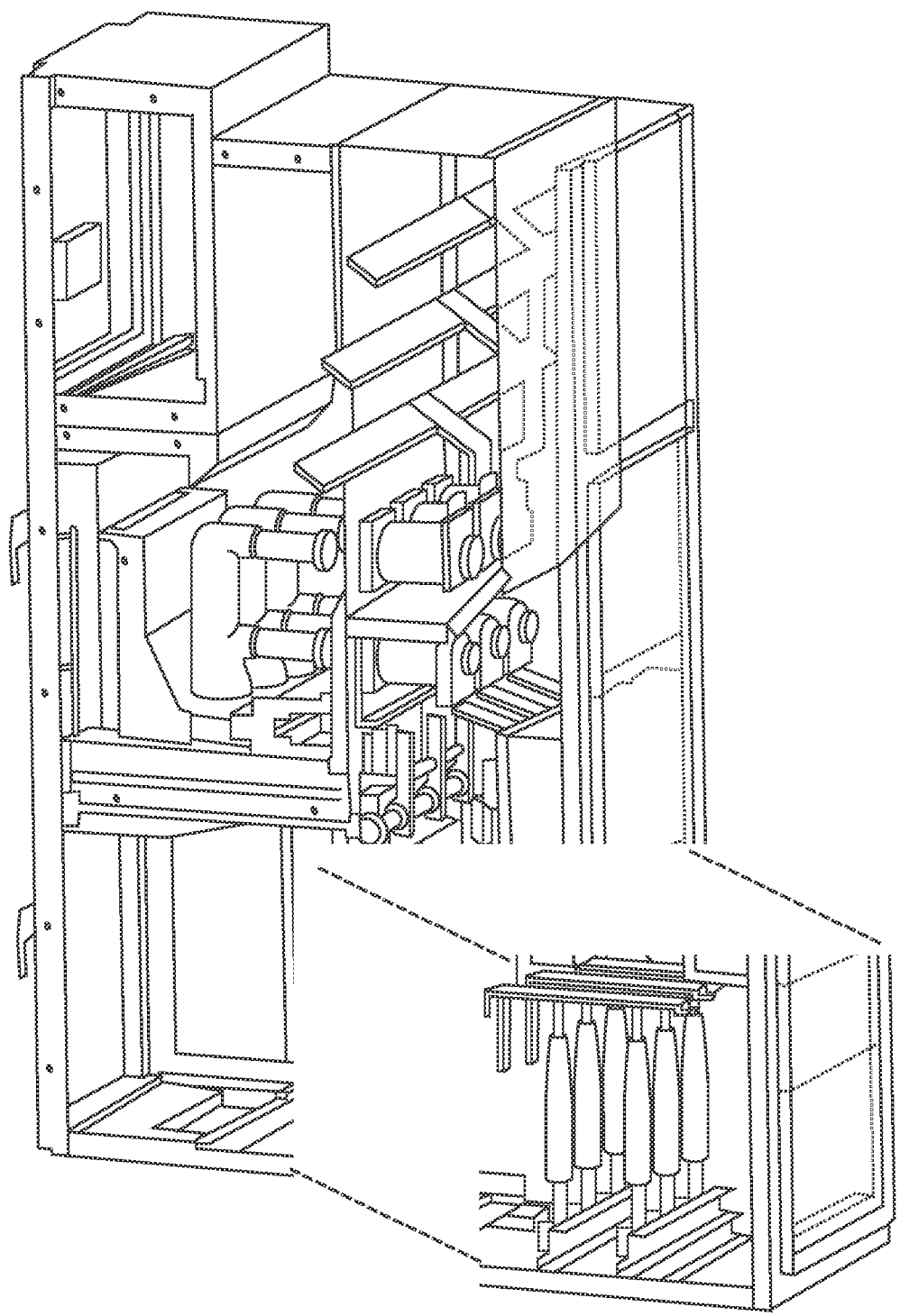
FIG. 2a and FIG. 2b are outline views of an example of a new design of switchgear where a part of the cable compartment can be separated from the other parts of the switchgear either on the right side (FIG. 2a) or on the left side (FIG. 2b), in accordance with the disclosure.
Figure 2B:
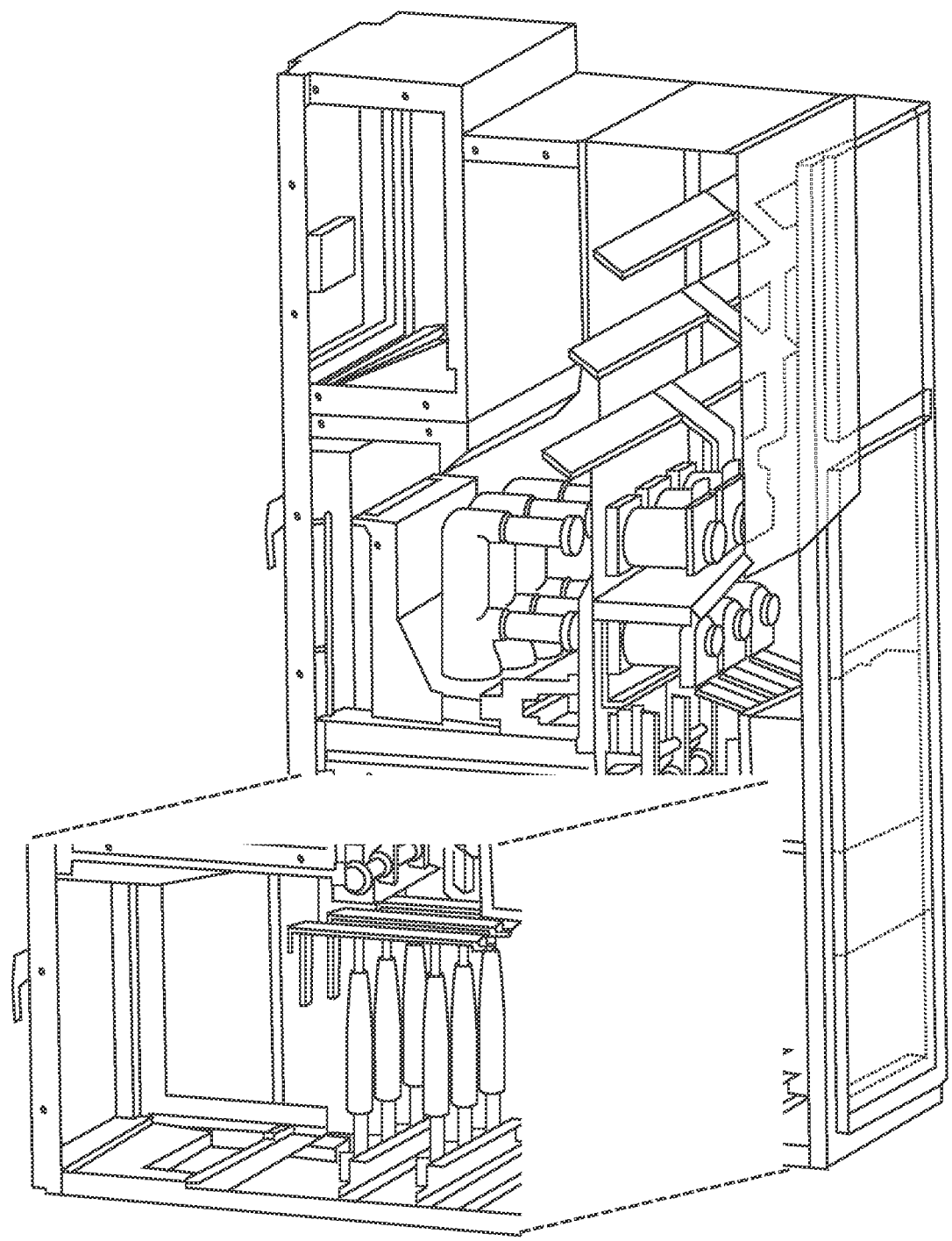

Depending on switchgear construction and internal structure, the cable compartment can be separated completely from the switchgear or the separable piece could be a dedicated part of said cable compartment, see for example FIGS. 2a and 2b, which show examples of cable compartment part separation for a medium voltage switchgear.

As the rest of medium-voltage switchgear needs to be connected to the separable piece of cable compartment during full installation, the design of such separable piece allows correct inter-connections between walls of the separable cable compartment and the remaining part of the switchgear for the primary circuits. The fully assembled switchgear then ensures the required parameters and functionality of the switchgear, e.g. the fully assembled switchgear then fulfill the internal arc requirements, safety standards and customer specifications.

The new design can also be used with switchgear having a reduced width, and this can be achieved in several different embodiments.

An example of such a separable cable compartment solution for a narrow switchgear design is shown in FIGS. 3a, 3b, and 3c. In FIG. 3a the cable compartment is shown in a connected condition. Separation is shown in panel cross-section at FIG. 3b and its back view at FIG. 3c.

Another example of such separation is shown in FIG. 4a, where the height at FIG. 4a is the same as that at FIG. 4b. Cables are fixed in their proper position using a limited number of parts of the cable compartment and a disposable template, that keeps the parts in their correct positions, therefore it is not necessary to separate the enclosing structures of cable compartment. Such parts include a bottom plate 14 of the cable compartment including cable fixation, temporary holder 11 per phase and supporting template 13 fixing the temporary holders in a required position. The remaining cable compartment parts can be delivered during assembly of the remaining switchgear parts, i.e. enclosing structures of cable compartment. The temporary holders and supporting structure can remain part of the cable compartment during service (and this case for example are made of an insulating material) or all the holders 11 and templates 13 are removed after the power cables are terminated and connected and after or before assembly of the cable connection bars to the rest of switchgear. This example allows comfortable access for cable installation from the front, rear, top and both lateral sides.

FIG. 5 shows an example of separation of the full cable compartment including its primary circuits and all enclosures from the rest of the switchgear. The separation in this example introduces additional (preferably removable but can also be bolted) connections on the primary circuits 30 and 31, that would allow the primary circuits of the cable compartment to be connected to the primary circuits of the rest of the switchgear in the installation process.

In all variants the cable compartments can be delivered long before the rest of the switchgear and components installed therein, and thus mitigate the time burden associated with the cable installation works as well as make the installation more simple.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In this manner a new switchgear or control gear design is provided that enables separation of the cable compartment of the medium-voltage switchgear or control gear from the main body of the switchgear. Thus, when the cable compartment is separated from the main body of the switchgear, the respective components of the cable compartment can be installed first and thus allow easier cable installation without the presence of the full panel. Access from one or more sides, that are currently blocked by the medium voltage switchgear panel, is also then facilitated allowing more than one person at a time working on the cable installation, and generally making such installation easier and quicker. Once the cables are connected, the main body of medium voltage panels can be attached to the cable compartment.

In an example, when the cable compartment is connected to the at least one first compartment, the medium voltage switchgear or control gear is configured to provide an arc proof outer surface.

In an example, when the cable compartment is disconnected from the at least one first compartment and spatially separated from the at least one first compartment, the cable compartment is configured to enable maintenance access from at least one side.

In an example, the plurality of auxiliary switchgear or control gear components comprises a cable connection bar that connects to the second connector at a first end and connects to the medium voltage cable at a second end. The cable connection bar is configured to be held in a connection position by a holder. The cable connection bar can be made from copper. The cable connection bar can however be made from any suitable kind of conductive material with sufficient mechanical strength (e.g. copper, aluminum, brass etc.)

In an example, the holder is configured to be removed from the cable compartment.

In an example, when the cable compartment is disconnected from the at least one first compartment and spatially separated from the at least one first compartment the cable connection bar is configured to be held in a connection position by the holder.

In an example, when the cable compartment is connected to the at least one first compartment the cable connection bar is configured to be held in the connection position by the holder.

In an example, the holder is compatible with medium voltage operation within a medium voltage switchgear or control gear.

In an example, a supporting template within the cable compartment is configured to fix the holder at a defined position.

In an example, the template is configured to be removed from the cable compartment.

In an example, the template is compatible with medium voltage operation within a medium voltage switchgear or control gear.

In an example, the first connector is directly connected or is part of the component of the plurality of main switchgear or control gear components.

In an example, the at least one first compartment comprises a plurality of compartments.

In an example, the first connector comprises a threaded hole within component and the second connector comprises a screw.

In an example, the first connector comprises a screw within component and the second connector (30) comprises a threaded hole.

In a second aspect, there is provided a medium voltage switchgear or control gear, comprising:
  at least one first compartment;
  a cable compartment;
  a plurality of main switchgear or control gear components; and
  a plurality of auxiliary switchgear or control gear components.

The plurality of main switchgear or control gear components comprises a main busbar system, a circuit breaker. The plurality of main switchgear or control gear components are configured to be housed in at least one part of the at least one first compartment. The plurality of auxiliary switchgear or control gear components comprises a medium voltage cable. The plurality of auxiliary switchgear or control gear components are configured to be housed in the cable compartment. The cable compartment comprises a first part and a second part. A first part of the medium voltage cable and a first connector are configured to be housed in the first part of the cable compartment. A second part of the medium voltage cable and a second connector are configured to be housed in the second part of the cable compartment. The second connector is configured to connect to the first connector to connect the medium voltage cable to a component of the plurality of main switchgear or control gear components. The second part of the cable compartment is configured to be disconnected from the first part of the cable compartment and spatially separated from the first part of the cable compartment and spatially separated from the at least one first compartment. The disconnection of the second part cable compartment from the first part of the cable compartment comprises a disconnection of the first connector from the second connector.

In other words, rather than having to disconnect the whole cable compartment, only a part of the cable compartment need be disconnected.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A medium voltage switchgear or control gear, comprising:
   at least one first compartment comprising a side configured to provide a closed portion of the at least one first compartment;
   a plurality of main switchgear or control gear components housed in the at least one first compartment, the plurality of main switchgear or control gear components comprising:
      a first connector affixed to the side configured to provide the closed portion, and
      at least one component of the plurality of main switchgear or control gear components connected to the first connector, the at least one component comprising a main busbar system, a circuit breaker, or a disconnector;
   a cable compartment comprising an open side; and
   a plurality of auxiliary switchgear or control gear components housed in the cable compartment, the plurality of auxiliary switchgear or control gear components comprising:
      a medium voltage cable,
      a second connector connected to the medium voltage cable, the second connector configured to be accessible through the open side of the cable compartment when the cable compartment is disconnected from the at least one first compartment and configured to connect to the first connector through the open side thereby connecting the medium voltage cable to the at least one component of the plurality of main switchgear or control gear components,
      a cable connection bar having a first end and an opposing second end, the first end configured to connect to the second connector and the second end configured to connect to the medium voltage cable, and
      a holder configured to hold the cable connection bar and the second connector in a connection position when the second connector is disconnected from the first connector, and configured to be removable when the second connector is disconnected from connected to the first connector,
   wherein, when the at least one first compartment is connected to the cable compartment, the closed portion of the at least one first compartment is configured to cover the open side of the cable compartment, and
   wherein, when the at least one first compartment is disconnected and spatially separated from the cable compartment, the first connector is configured to be disconnected from the second connector and the second connector is configured to be exposed through the open side of the cable compartment and enable access of the cable compartment through the open side.

2. The medium voltage switchgear or control gear according to claim 1, wherein when the cable compartment is connected to the at least one first compartment, the medium voltage switchgear or control gear is configured to provide an arc proof outer surface.

3. The medium voltage switchgear or control gear according to claim 1, wherein, when the cable compartment is connected to the at least one first compartment, the cable connection bar is configured to be held in the connection position by the holder.

4. The medium voltage switchgear or control gear according to claim 1, wherein the holder is compatible with medium voltage operation within the medium voltage switchgear or control gear.

5. The medium voltage switchgear or control gear according to claim 1, wherein a supporting template within the cable compartment is configured to fix the holder at a defined position.

6. The medium voltage switchgear or control gear according to claim 5, wherein the supporting template is configured to be removed from the cable compartment.

7. The medium voltage switchgear or control gear according to claim 5, wherein the supporting template is compatible with medium voltage operation within a within the medium voltage switchgear or control gear.

8. The medium voltage switchgear or control gear according to claim 1, wherein the first connector is directly connected to or is part of the at least one component of the plurality of main switchgear or control gear components.

9. The medium voltage switchgear or control gear according to claim 1, wherein the at least one first compartment comprises a plurality of compartments.

10. The medium voltage switchgear or control gear according to claim 1, wherein the first connector comprises a threaded hole and the second connector comprises a screw, or the first connector comprises the screw and the second connector comprises the threaded hole.

11. A medium voltage switchgear or control gear, comprising:
    at least one first compartment;
    a plurality of main switchgear or control gear components housed in the at least one first compartment, the plurality of main switchgear or control gear components comprising: at least one component of the plurality of main switchgear or control gear components, the at least one component comprising a main busbar system, a circuit breaker, or a disconnector;
    a cable compartment comprising:
       a first part fixedly attached to the at least one first compartment, the first part comprising a first connector connected to the at least one component of the plurality of main switchgear or control gear component, and
       a second part having at least one open side, the second part comprising:
          a plurality of auxiliary switchgear or control gear components housed in the second part of the cable compartment, the plurality of auxiliary switchgear or control gear components comprising:
             a medium voltage cable,
             a second connector connected to the medium voltage cable, the second connector configured to be accessible through the at least one open side of the second part of the cable compartment when the second part of the cable compartment is disconnected from the first part of the cable compartment and configured to connect to the first connector of the first part of the cable compartment thereby connecting the medium voltage cable to the at least one component of the plurality of main switchgear or control gear components,
             a cable connection bar having a first end and an opposing second end, the first end configured to connect to the second connector and the second end configured to connect to the medium voltage cable, and a holder configured to hold the cable connection bar and the second connector in a connection position when the second connector is disconnected from the first connector, and configured to be removable when the second connector is disconnected from connected to the first connector, wherein, when the first part of the cable compartment is connected to the second part of the cable compartment, the second part of the cable compartment is configured to close the first part of the cable compartment, and wherein the second part of the cable compartment is configured to be spatially separated from the first part of the cable compartment, the first connector is configured to be disconnected from the second connector, and the second connector is configured to be exposed through the at least one open side of the second part of the cable compartment and enable access of the second part of the cable compartment through the at least one open side of the second part of the cable compartment.

* * * * *